US 8,068,421 B2

(12) United States Patent
Williams

(10) Patent No.: US 8,068,421 B2
(45) Date of Patent: Nov. 29, 2011

(54) ARRANGEMENT AND METHOD FOR SESSION CONTROL IN WIRELESS COMMUNICATION NETWORK

(75) Inventor: Andrew Gordon Williams, Swindon (GB)

(73) Assignee: Wireless Technology Solutions LLC, New York, NY (US)

( * ) Notice: Subject to any disclaimer, the term of this patent is extended or adjusted under 35 U.S.C. 154(b) by 1543 days.

(21) Appl. No.: 10/529,961

(22) PCT Filed: Oct. 1, 2003

(86) PCT No.: PCT/GB03/04253
§ 371 (c)(1),
(2), (4) Date: Nov. 3, 2005

(87) PCT Pub. No.: WO2004/032450
PCT Pub. Date: Apr. 15, 2004

(65) Prior Publication Data
US 2006/0251000 A1    Nov. 9, 2006

(30) Foreign Application Priority Data
Oct. 1, 2002   (GB) .................................. 0222632.2

(51) Int. Cl.
G01R 31/08     (2006.01)

(52) U.S. Cl. ........................................ 370/235; 713/154

(58) Field of Classification Search .................. 370/229, 370/218, 329; 713/154
See application file for complete search history.

(56) References Cited

U.S. PATENT DOCUMENTS

| 6,452,915 | B1 | 9/2002 | Jorgensen |
| 6,621,793 | B2 | 9/2003 | Widegren et al. |
| 6,847,610 | B1* | 1/2005 | Suumaki et al. ............ 370/230.1 |
| 2002/0036983 | A1 | 3/2002 | Widegren et al. |
| 2002/0114274 | A1 | 8/2002 | Sturges et al. |
| 2003/0193967 | A1* | 10/2003 | Fenton et al. ................. 370/490 |
| 2003/0235184 | A1* | 12/2003 | Dorenbosch et al. ......... 370/352 |
| 2005/0235349 | A1* | 10/2005 | Boyle et al. ..................... 726/11 |
| 2006/0029104 | A1* | 2/2006 | Jungck .......................... 370/498 |

FOREIGN PATENT DOCUMENTS

GB    2395090 A    5/2004
(Continued)

OTHER PUBLICATIONS

3GPP (Mar. 2001). "3rd Generation Partnership Project; Technical Specification Group Terminals; Mobile Station Application Execution Environment (MExE); Functional Description; Stage 2 (Release 1999)," *3GPP TS 23.057* V3.4.0, pp. 1-60.
(Continued)

Primary Examiner — Nick Corsaro
Assistant Examiner — Marcos Batista
(74) Attorney, Agent, or Firm — Fitch Even Tabin & Flannery

(57) ABSTRACT

An arrangement and method for session control in a wireless UMTS radio access network (100) by performing creation and deletion of application-specific packet sessions (PDP contexts) in the network, with application-specific QoS parameters, without requiring the explicit cooperation of the application software (either via software API or modem AT command). This allows session set-up and tear-down control of dedicated packet sessions for particular data services, in a UMTS 3G mobile wireless network, with application-specific QoS parameters, with umodified applications operating over the network.

42 Claims, 10 Drawing Sheets

FOREIGN PATENT DOCUMENTS

| | | |
|---|---|---|
| WO | WO 01/17291 A1 | 3/2001 |
| WO | WO-0230056 A2 | 4/2002 |
| WO | WO 02/104046 A1 | 12/2002 |

OTHER PUBLICATIONS

3GPP (Dec. 2001). "3rd Generation Partnership Project; Technical Specification Group Core Network; Mobile Radio Interface Layer 3 Specification; Core Network Protocols—Stage 3 (Release 1999)," *3GPP* TS 24.008 V3.10.0, pp. 1-447.

3GPP (Dec. 2001). "3rd Generation Partnership Project; Technical Specification Group Terminals; AT Command Set for User Equipment (UE) (Release 1999)," *3GPP* TS 27.007 V3.10.0, pp. 1-159.

3GPP (Sep. 2002). "3rd Generation Partnership Project; Technical Specification Group Services and System Aspects; Quality of Service (QoS) Concept and Architecture," *3GPP* TS 23.107 V3.9.0, pp. 1-39.

3GPP (Sep. 2002). "3rd Generation Partnership Project; Technical Specification Group Services and System Aspects; End-to-End Quality of Service (QoS) Concept and Architecture; (Release 5)," *3GPP* TS 23.207 V5.5.0, pp. 1-48.

Rosenberg, J. et al. (Jun. 2002). "SIP: Session Initiation Protocol," *3GPP* Request for Comments: 3261, pp. 1-269.

Stevens, W.R. (1994). "TCP Connection Establishment and Termination" Chapter 18 *In TCP/IP Illustrated: The Protocols* Addison Wesley Publishing Company, vol. 1, pp. 229-262.

"Digital Cellular Telecommunications System (Phase 2+); Universal Mobile Telecommunications System (UMTS); End to End Quality of Service (QoS) Concept and Architecture (3GPP TS 23.207 Version 5.5.0 Release 5)," (Sep. 2002). ETSI 123 207 v5.5.0: 1-48.

European Office Action mailed Jul. 20, 2005, for European Application No. 03756551.2 filed Jan. 10, 2003, 4 pages.

Great Britain Search Report mailed Mar. 25, 2003, for Great Britain Application No. 0222632.2 filed Jan. 10, 2002, 2 pages.

International Search Report mailed Jul. 16, 2004, for PCT Application No. PCT/GB03/04253 filed Jan. 10, 2003, 3 pages.

\* cited by examiner

ARRANGEMENT AND METHOD FOR SESSION CONTROL IN WIRELESS COMMUNICATION NETWORK

FIELD OF THE INVENTION

This invention relates to session control in communication networks, and particularly (though not exclusively) wireless networks such as UMTS 3G (Universal Mobile Telecommunication System $3^{rd}$ Generation) mobile wireless networks.

BACKGROUND OF THE INVENTION

In the field of this invention it is known that the UMTS specifications:
 [1] 3GPP TS 23.107—3rd Generation Partnership Project; Technical Specification Group Services and System Aspects; QoS Concept and Architecture (Release 1999)"
 [2] 3GPP TS 27.007—3rd Generation Partnership Project; Technical Specification Group Terminals; AT command set for User Equipment (UE) (Release 1999)"
 [3] 3GPP TS 23.057—3rd Generation Partnership Project; Technical Specification Group Terminals; Mobile Station Application Execution Environment (MExE); Functional description; Stage 2 (Release 1999) and
 [4] 3GPP TS 24.008—3rd Generation Partnership Project; Technical Specification Group Core Network; Mobile radio interface layer 3 specification; Core Network Protocols—Stage 3 (Release 1999)
work on the principle that data packets for different data flows relating to specific services, are carried over separate packet sessions over the air. For example, streaming audio packets could be carried over one packet session, web browsing over another, email download over another, etc. The logic for this is that different QoS parameters (bandwidth, latency etc.) can be applied to the different services being used.

The UMTS standards [1] define 4 'classes' of packet flows, based on 4 categories of applications:
 Conversational class (e.g., interactive voice/video)
 Streaming class (e.g., streaming media such as Internet radio, or streaming video)
 Interactive class (e.g., web browsing)
 Background class (e.g., email download).

The corollary of this is that the wireless network needs to know when particular services are being used, so that it can correctly route data packets for each session over the relevant packet session over the air.

The UMTS standards imply a tight coupling between the applications and the mobile device, whereby the applications inform the mobile device (UE) that they are starting up, and what are the QoS characteristics of the traffic they will be sending/receiving. This will either be a direct, software interface in the case of integrated mobile devices as in standards [3] or can be an AT command interface as in standards [2].

However, the problem with the approach in the current set of UMTS specifications is that they require special versions of application software (email clients, web browsers, video streaming clients, etc.) to implement an (internal or external) interface to the UE. A standard PC (Personal Computer), when connected to a UE, with standard applications, will not support such an interface and therefore cannot support packet flows of different QoS for different applications, as demanded by the standards.

A need therefore exists for arrangement and method for session control in wireless communication network wherein the abovementioned disadvantage(s) may be alleviated.

Stateful inspection is an existing, well-known technology, used in Internet firewalls—a firewall blocks packets coming into or out of a network, except those explicitly allowed. Stateful inspection is a process whereby the firewall inspects packets flowing into it, implies the state of an application-specific packet session via the control packets, then allows data packets for that session to flow through the firewall, if the policy for flows of that type allow it.

The basic example of stateful inspection is the allowing through of TCP (Transmission Control Protocol) sessions originated from inside the firewall to an IP (Internet Protocol) address on the outside to be allowed, but TCP sessions from outside to be blocked—this is the mechanism that allows through web browsing and FTP (File Transfer Protocol) requests from the inside of a firewall, but blocks requests from the outside to web servers inside the firewall.

This is done by catching TCP connection request packets (packets originating from inside the firewall with the 'SYN' flag set), starting the TCP '3-way handshake' (as explained, for example, in Chapter 18 of "TCP/IP Illustrated, Volume 1, The Protocols" authored by W. Richard Stevens and published by Addison Wesley), then opening up the source and destination IP addresses and TCP port numbers, forwarding on the packet to the outside and then monitoring the subsequent TCP control packets to ensure the connection came up and also to catch the eventual tear-down of the TCP session.

Another example of stateful inspection in firewalls for a UDP-based (User Datagram Protocol-based) service is to allow voice over IP (VoIP) calls through the firewall. In this example, incoming VoIP call-control messages are inspected and parsed to reveal the VoIP end-points (IP address and port number) and allow voice data packets through the firewall.

STATEMENT OF INVENTION

In accordance with a first aspect of the present invention there is provided an arrangement for session control in a wireless communication network as claimed in claim 1.

In accordance with a second aspect of the present invention there is provided a method for session control in a wireless communication network as claimed in claim 19.

BRIEF DESCRIPTION OF THE DRAWINGS

One arrangement and method for session control in a wireless communication network incorporating the present invention will now be described, by way of example only, with reference to the accompanying drawings, in which.

DESCRIPTION OF PREFERRED EMBODIMENT(S)

Figure 1:
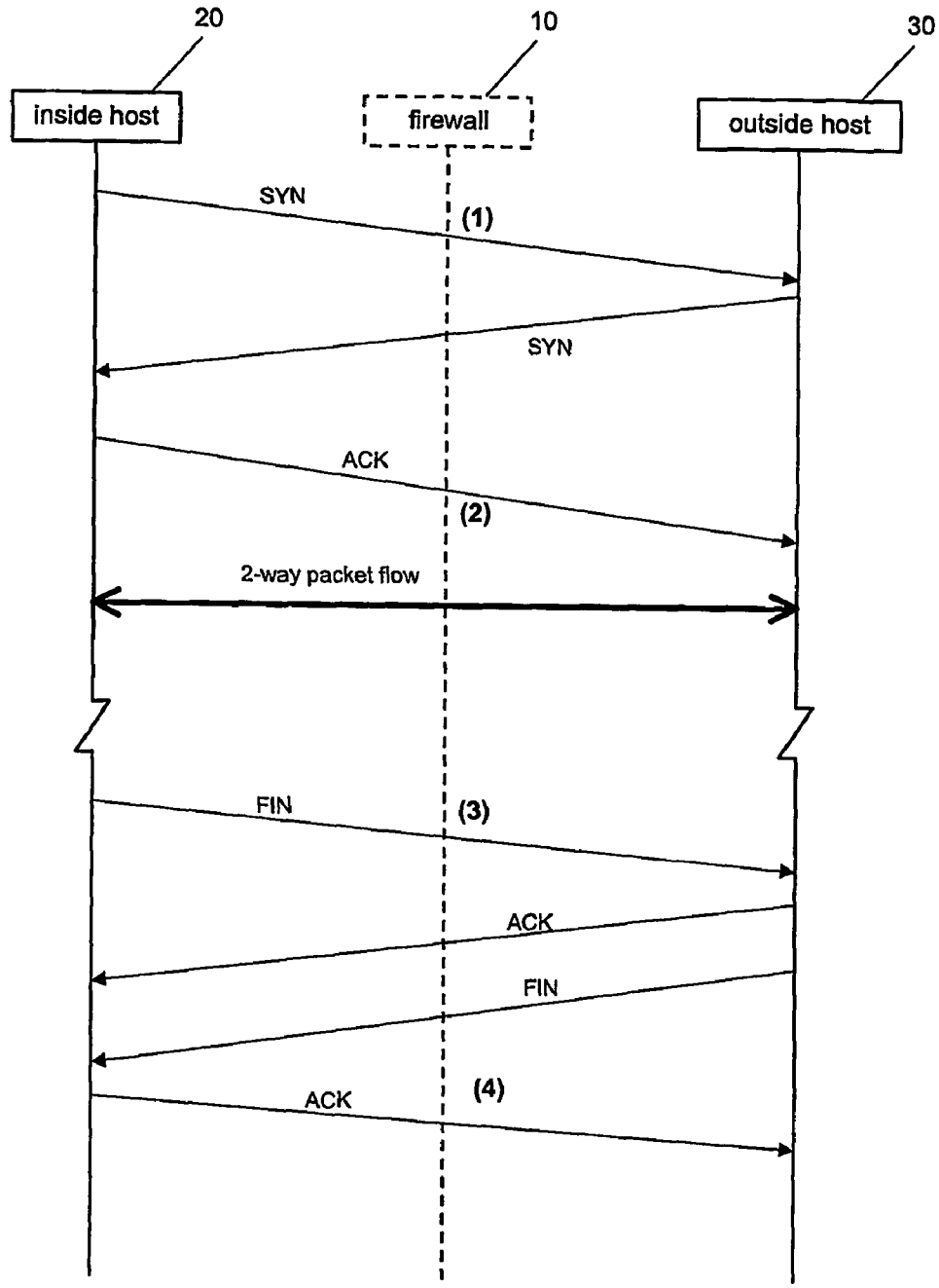
FIG. 1 shows a schematic diagram illustrating prior art data flow across an Internet network firewall between an inside host and an outside host, and showing set-up and tear-down of a session.

Referring firstly to FIG. 1, a known Internet network firewall 10 intermediates between an inside host 20 and an outside host 30. Operation of the firewall 10 is as follows:

At (1), session set-up begins when an outgoing TCP connection detected. The firewall 10 is opened up for remote IP address and source and destination TCP port numbers, and waits for a SYN response; a session object created by a stateful inspector (not shown).

At (2), the end of 3-way handshake detected, and 2-way TCP session packets are allowed to flow.

At (3), the start of TCP connection tear-down detected with a FIN packet from the inside host 20.

At (4), the TCP session teardown is complete, and far end IP address & session TCP port numbers are blocked by the firewall 10.

Figure 2:
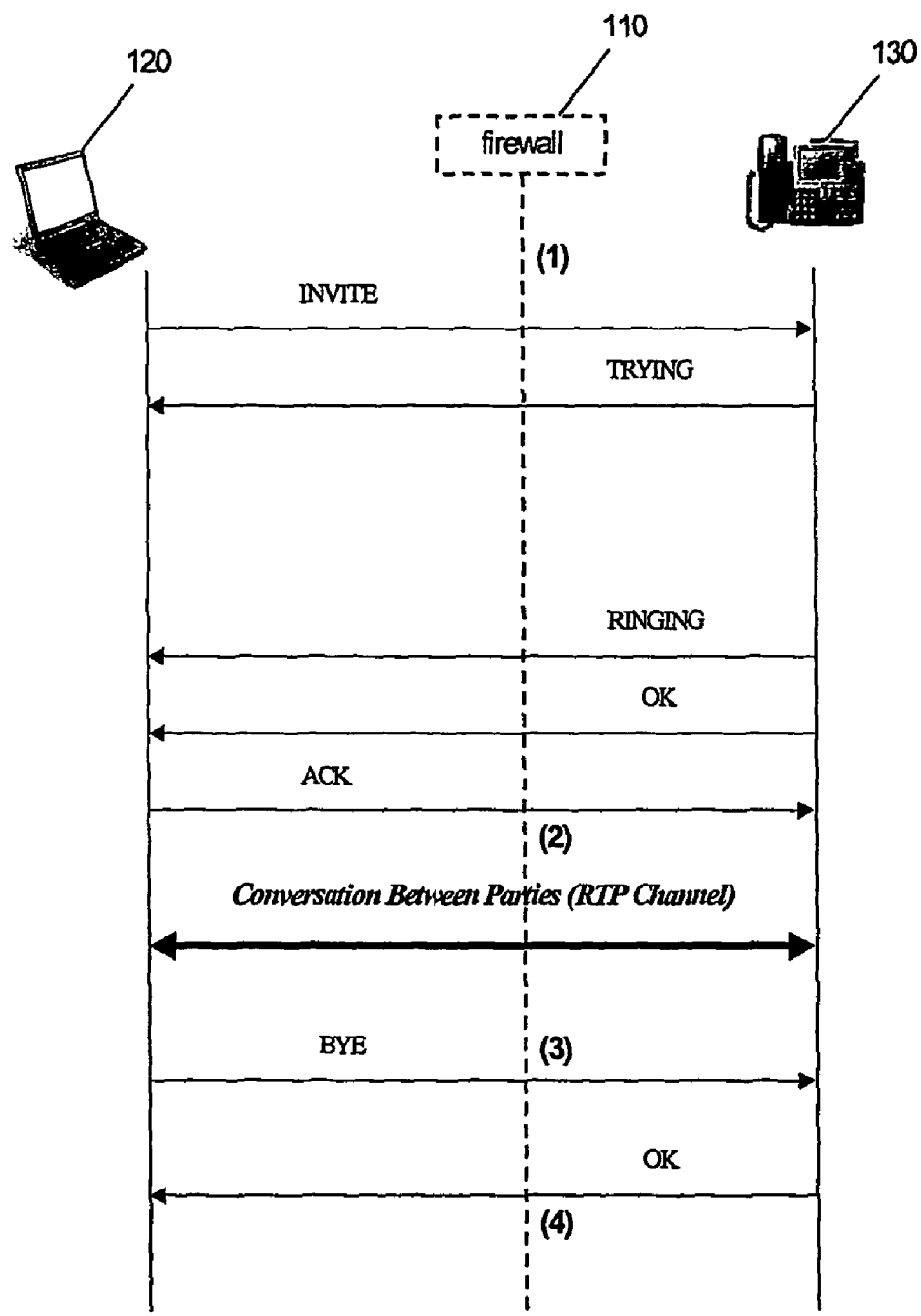
FIG. 2 shows a schematic diagram illustrating prior art VoIP data flow across an Internet network firewall between a PC and an Internet Protocol telephone set and showing set-up and tear-down.

Referring now to FIG. 2, a known Internet network firewall 110 intermediates VoIP data flow between a PC (Personal Computer) 120 and an Internet Protocol telephone set 130. Operation of the firewall 110 is as follows:

At (1), session set-up begins when an outgoing SIP session request (INVITE) is detected. The firewall 110 is opened up for remote IP address and source and destination port numbers for SIP control messages, and waits for an ACK response; a session object is created by a stateful inspector (not shown).

At (2), a successful ACK is received, and UDP source and destination port numbers are opened up for an RTP session, based on fields parsed out of INVITE and ACK messages. 2-way UDP voice session packets are allowed to flow.

At (3), start of SIP connection tear-down is detected.

At (4), SIP session teardown is complete, and far end IP address and session UDP port numbers are blocked by the firewall 110.

However, the firewalls 10 and 110 are known only in fixed-line, i.e., wired, applications.

The UMTS standards define 4 'classes' of packet flows, based on 4 categories of applications (conversational class—e.g., interactive voice/video; streaming class—e.g., streaming media such as Internet radio, or streaming video; interactive class—e.g., web browsing; and background class—e.g., email download).

The wireless network therefore needs to know when particular services are being used, so that it can correctly route data packets for each session over the relevant packet session over the air.

The UMTS standards imply a tight coupling between the applications and the mobile device, whereby the applications inform the mobile device (UE) that they are starting up, and what are the QoS characteristics of the traffic they will be sending/receiving. This will either be a direct, software interface in the case of integrated mobile devices as in standards, or can be an AT command interface as in standards.

However, the problem with the approach in the current set of UMTS specifications is that they require special versions of application software (email clients, web browsers, video streaming clients, etc.) to implement an (internal or external) interface to the UE. A standard PC (Personal Computer), when connected to a UE, with standard applications, will not support such an interface and therefore cannot support packet flows of different QoS for different applications, as demanded by the standards.

In a preferred embodiment, the present invention overcomes this drawback by applying Stateful Inspection to UMTS Session Management.

Briefly stated, in a preferred embodiment, stateful inspection is used in a UTRA (UMTS Terrestrial Radio Access) system to examine the data packets, to detect the existence of different application-specific packet flows, which then allows packet-sessions, called PDP (Packet Data Protocol) contexts in the UMTS standards, to be created over the air with the required QoS parameters.

The UE brings up a default PDP context for basic data service; all packets are then inspected, both incoming and outgoing, and application-specific traffic is used to open-up dedicated PDP contexts to carry that traffic.

One example of how this is used is detection of a POP3 email download, mapping it to a 'background class' PDP context.

Figure 3:
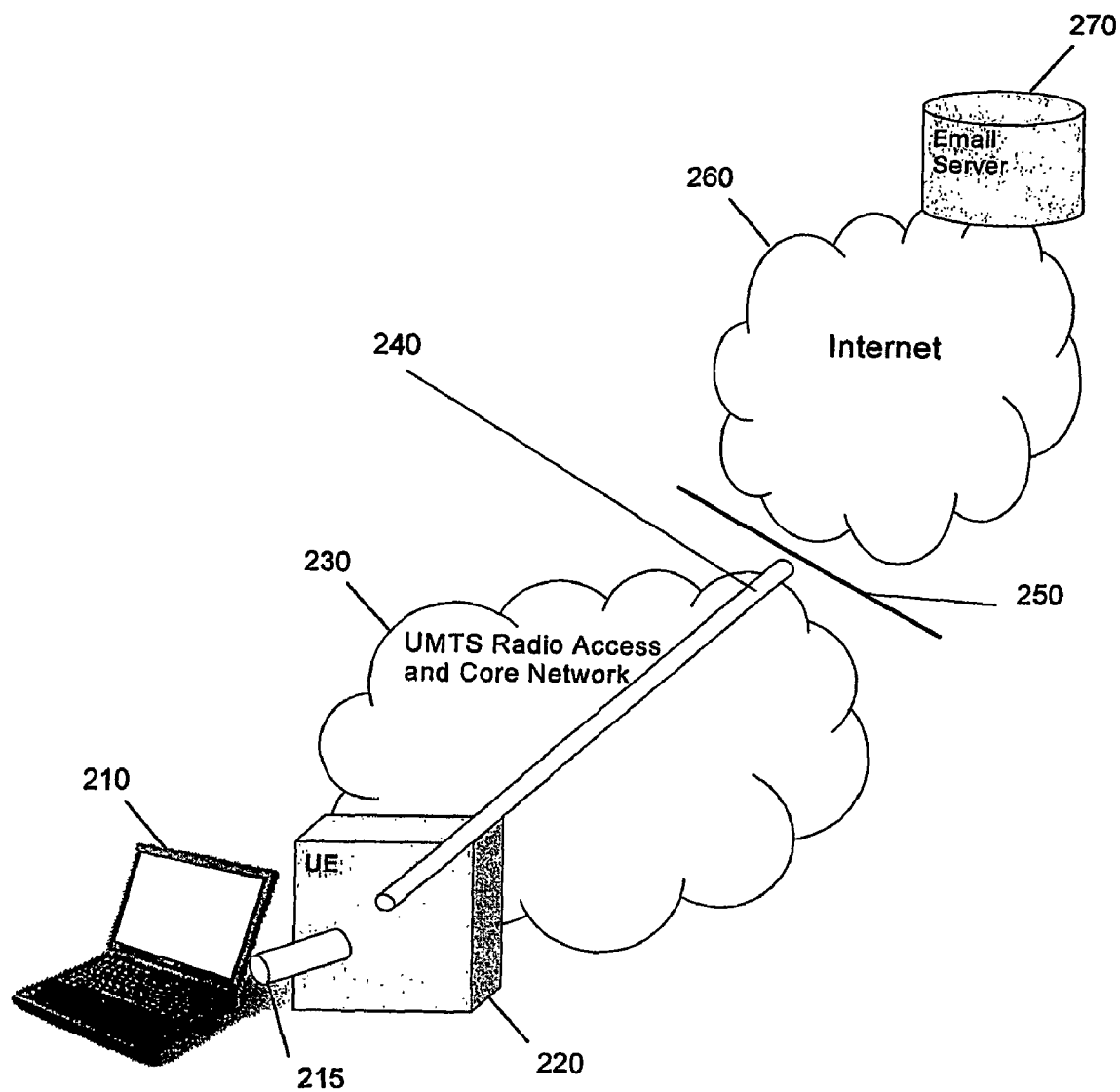
FIG. 3 shows a schematic diagram of an arrangement illustrating application of stateful inspection to UMTS session management, in the context of POP3 email download, which is mapped to a 'background class' PDP context, in accordance with the present invention.

As depicted in FIG. 3, a PC 210 (generally referred to as TE—Terminal Equipment—in UMTS terminology) is coupled, via R interface 215, to UMTS UE 220 (containing a USIM—not shown—which together with the UE forms MT—Mobile Terminal—in UMTS terminology). The UE 220 is coupled through the UMTS radio access and core network 230 via at least a default PDP context 240. The UMTS radio access and core network 230 is coupled via a Gi reference point 250) to the Internet 260, containing an email server 270.

Figure 4:
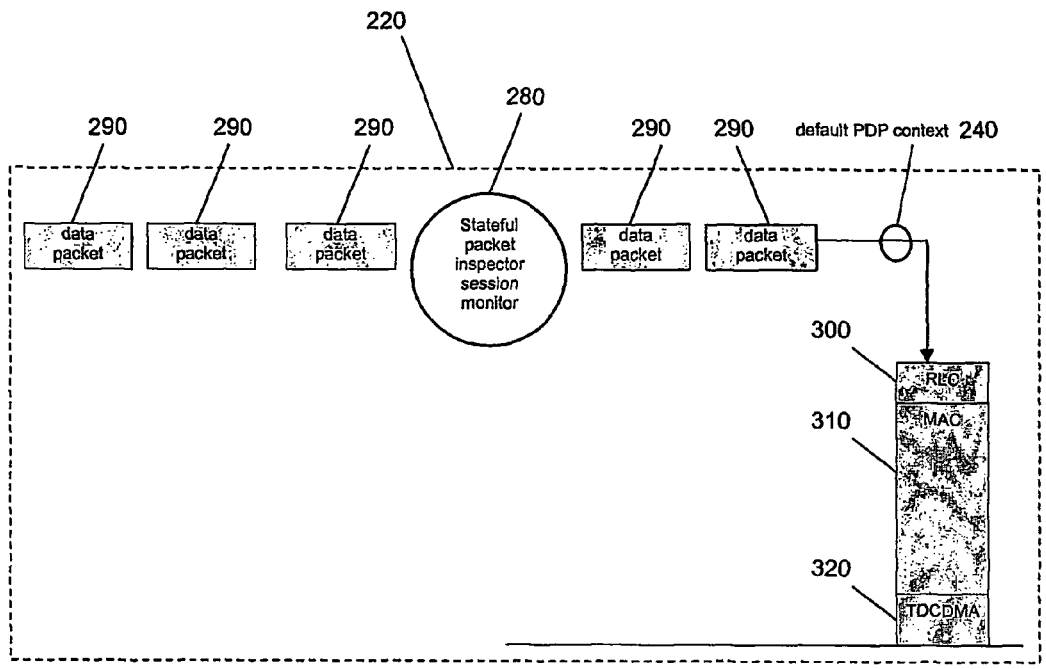
FIG. 4 shows a block schematic diagram illustrating flow of data packets in a default PDP context of the arrangement of FIG. 3.
Figure 5:
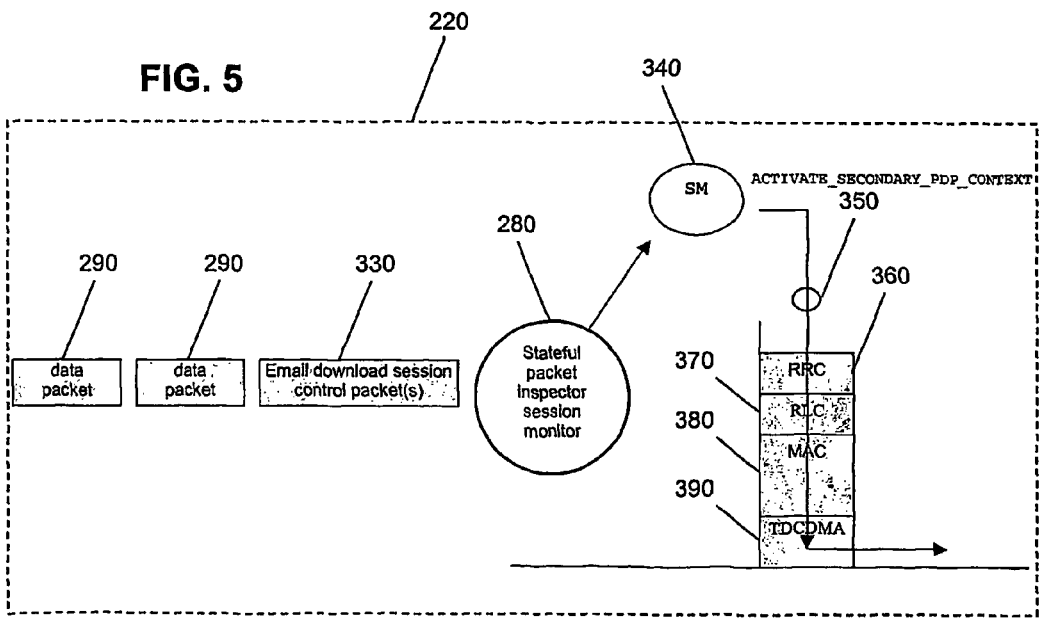
FIG. 5 shows a block schematic diagram illustrating detection of email download session control packets to activate a secondary PDP context for the email download session in the arrangement of FIG. 3.
Figure 6:
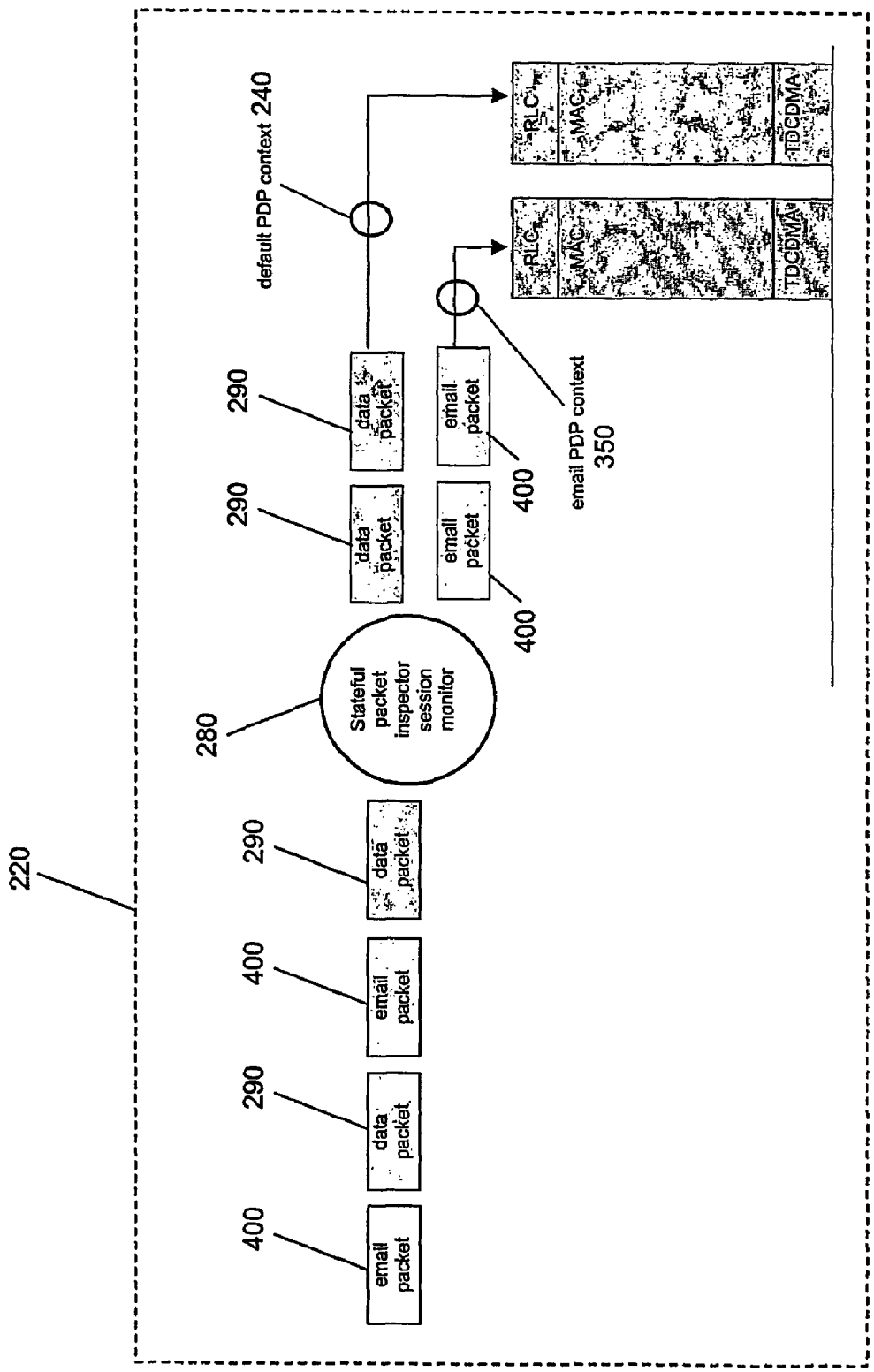
FIG. 6 shows a block schematic diagram illustrating flow of email packets and other data packets, and their respective processing as two parallel contexts, during the email download session in the arrangement of FIG. 3.

Referring now also to FIG. 4, FIG. 5 and FIG. 6, the UE 220 contains a stateful inspection session monitor 280.

As shown in FIG. 4, the stateful inspection session monitor 280 monitors packets 290 on the default PDP context 240, looking for email download control messages. In the absence of an email download control message, the UE 220 processes the data packets 290 through RLC (Radio Link Controller) 300, MAC (Medium Access Controller) 310 and CDMA (Time-Division Code-Division-Multiple-Access) physical air interface 320 in known manner.

As shown in FIG. 5, when the stateful inspection session monitor 280 detects an email download control message 330, it causes a session manager 340 to activate a secondary PDP context 350. In the activated secondary PDP context 350, the email download control packet(s) are processed through RRC (Radio Resource Controller) 360, RLC 370, MAC 380 and CDMA physical air interface 390 in known manner.

As shown in FIG. 6, after activation of the secondary PDP context 350, data packets 290 and email packets 400 are processed in parallel in separate PDP contexts as follows:
- data packets 290 are processed in default PDP context 240, and
- email packets 400 are processed in PDP context 350.

Figure 7:
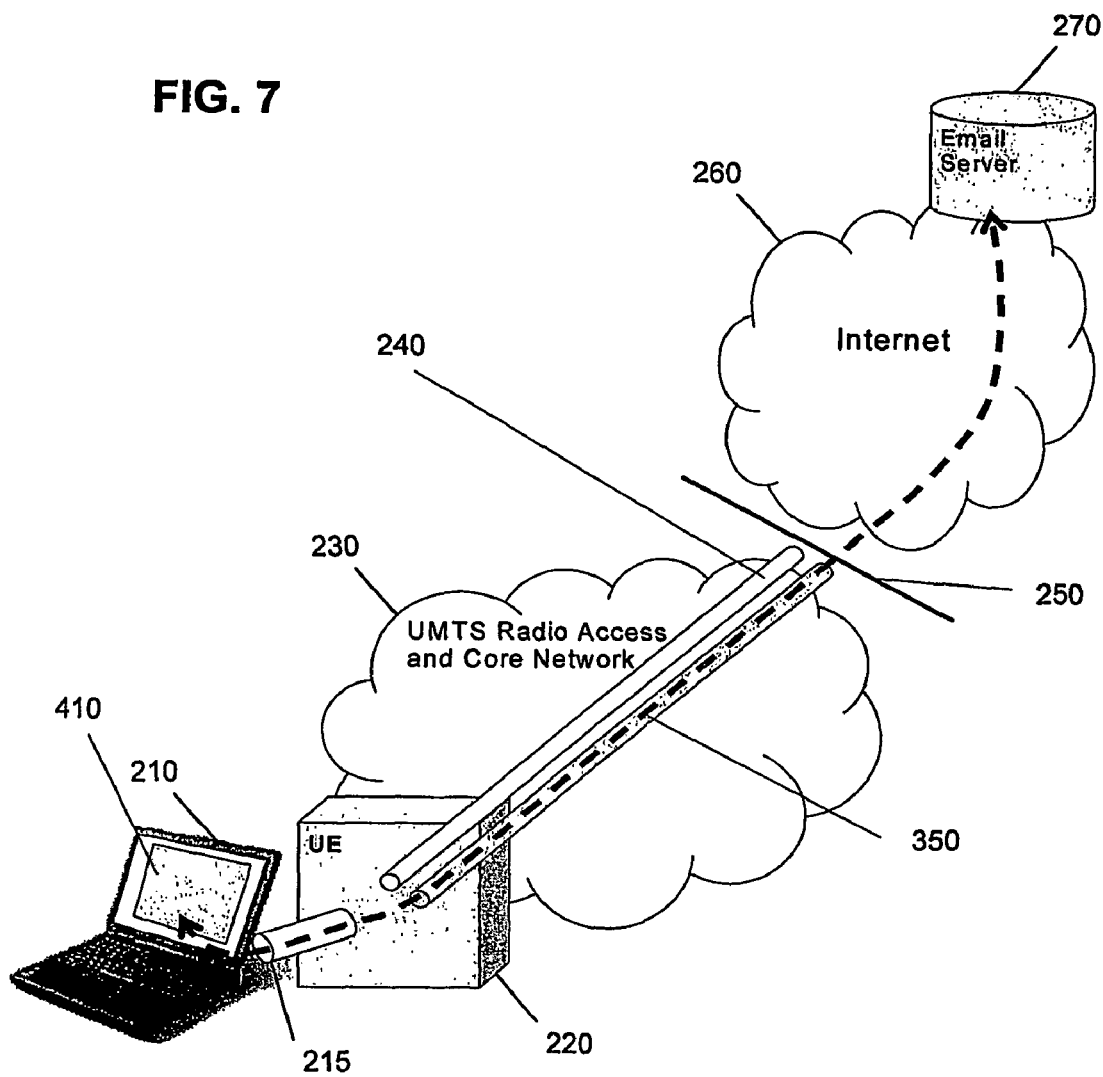
FIG. 7 shows a schematic diagram of an arrangement, similar to FIG. 3, illustrating the use of simultaneous default and secondary PDP contexts to provide separate PDP contexts for the email and data packets of FIG. 6.

Thus, as shown in FIG. 7, the email download session is conducted between the email server 270 and an email program 410 (running on the PC 210) via the PDP context 350, while the default PDP context 240 continues to process data packets as before.

Figure 8:
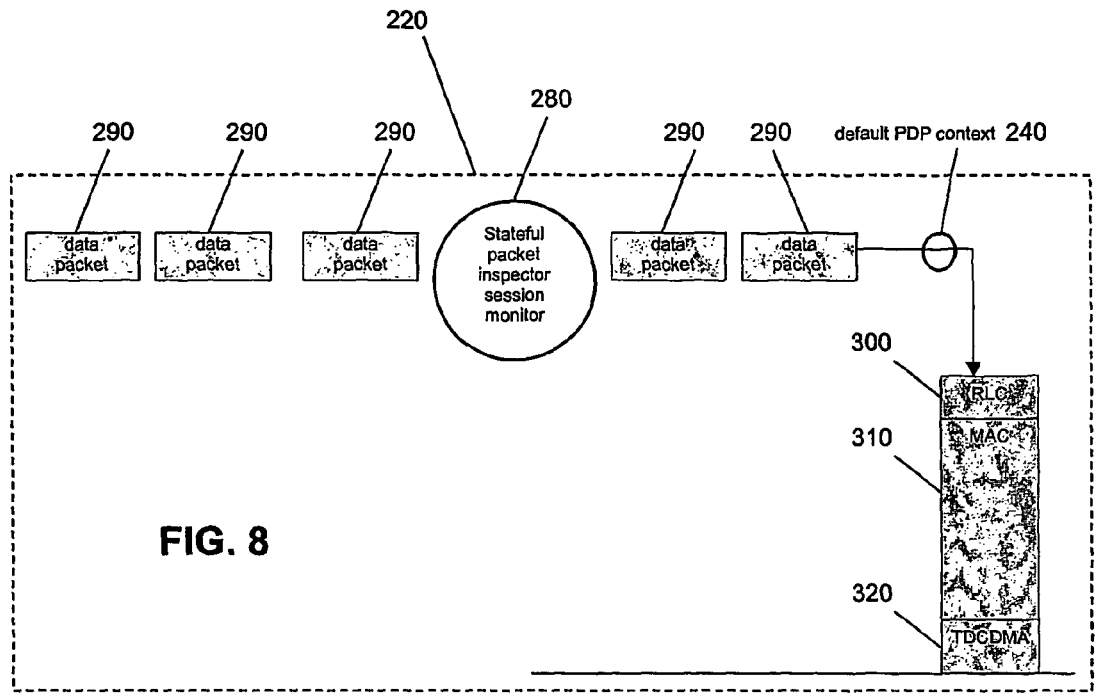
FIG. 8 shows a block schematic diagram illustrating flow of data packets in a default PDP context.
Figure 9:
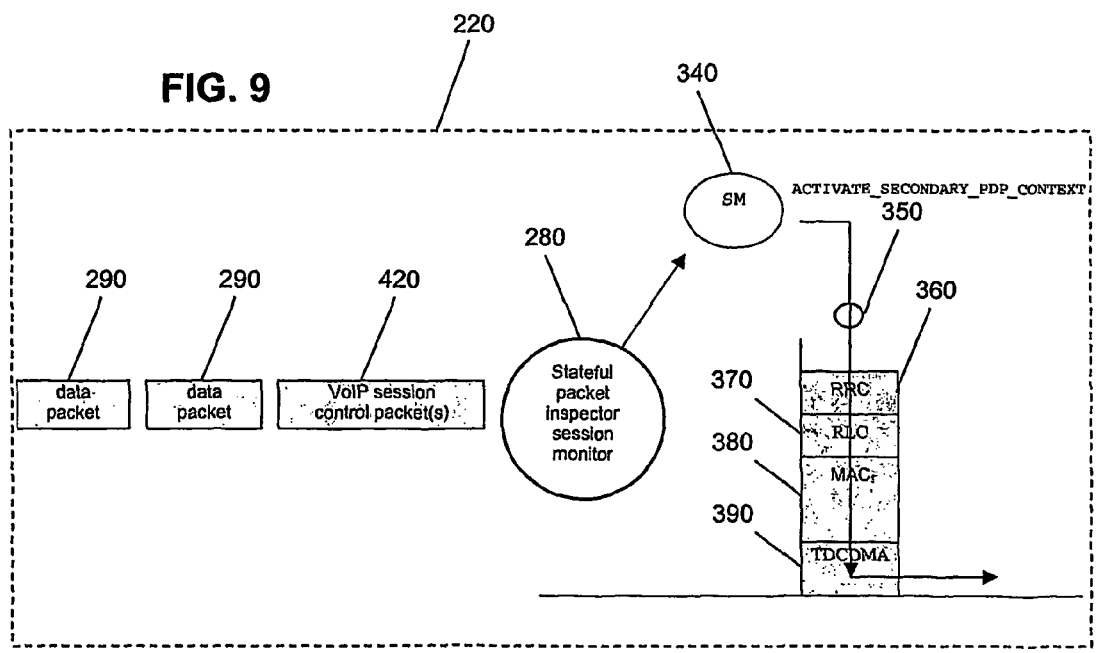
FIG. 9 shows a block schematic diagram illustrating detection of VoIP session control packets to activate a secondary PDP context for controlling a VoIP session.
Figure 10:
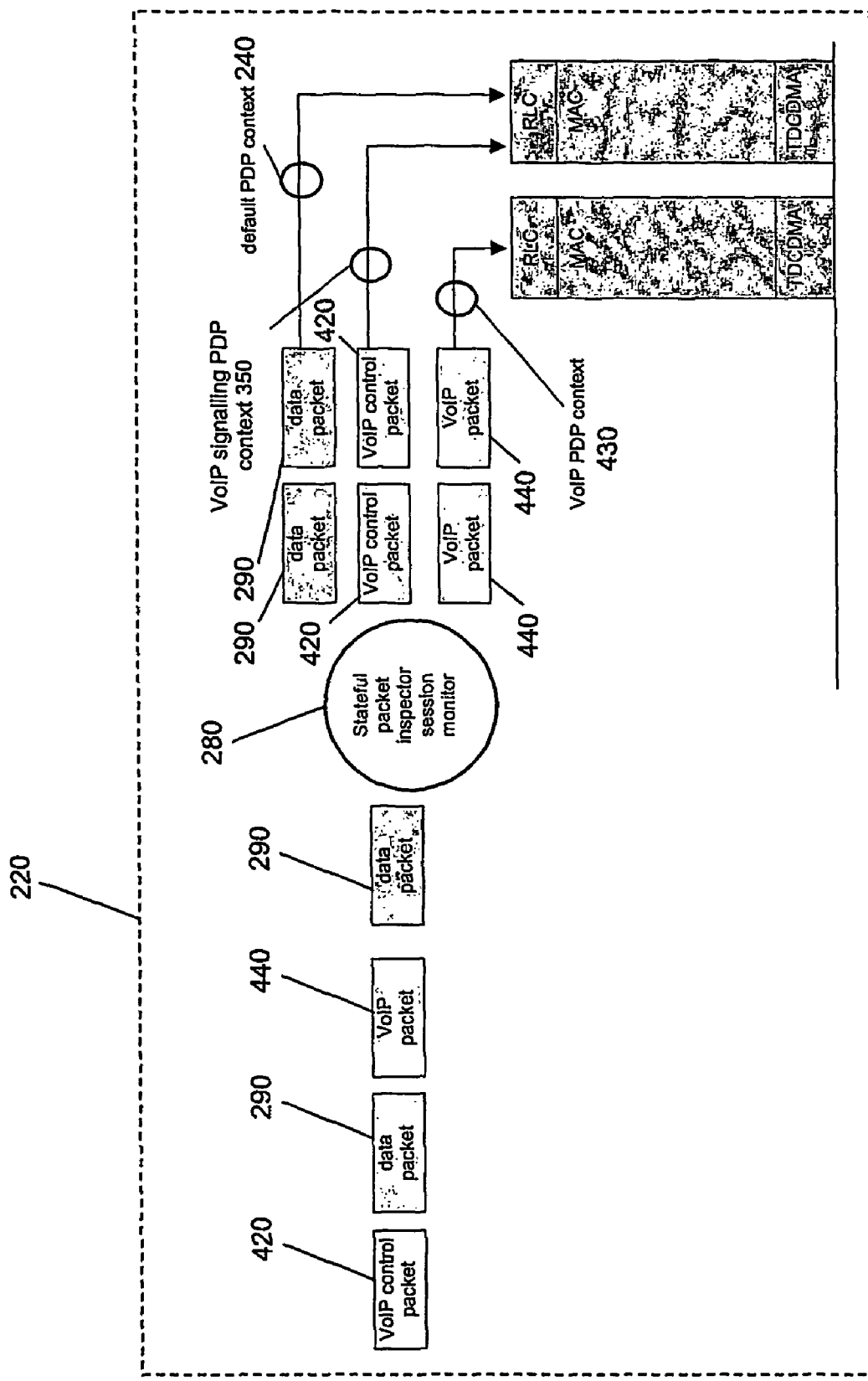
FIG. 10 shows a block schematic diagram illustrating flow of VoIP session control packets, VoIP packets and other packets, and their respective processing as two parallel contexts, during a VoIP session.

Referring now to FIG. 8, FIG. 9 and FIG. 10, another example application of the present invention, is a VoIP session initiation using SIP (as in 3GPP RFC—Request For Comments—3261"SIP: Session Initiation Protocol", June 2002) which is mapped into a conversational class PDP context to carry the VoIP traffic and an interactive class PDP context to carry the VoIP signalling.

As shown in FIG. 8, the stateful inspection session monitor 280 monitors packets 290 on the default PDP context 240, looking for VoIP session control packet(s). In the absence of a VoIP session control packet, the UE 220 processes the data packets 290 through RLC (Radio Link Controller) 300, MAC (Medium Access Controller) 310 and CDMA (Time-Division Code-Division-Multiple-Access) physical air interface 320 in known manner.

As shown in FIG. 9, when the stateful inspection session monitor 280 detects VoIP session control packet(s) 420, it causes session manager 340 to activate a secondary PDP context 350. In the activated secondary PDP context 350, the VoIP session control packet (s) are processed through RRC (Radio Resource Controller) 360, RLC 370, MAC 380 and CDMA processor 390 in known manner. Referring now also to FIG. 10, detection of VoIP session control packet(s) also causes SM 340 to activate a further secondary PDP context 430.

As shown in FIG. 10, after activation of the secondary PDP context 350 and the further secondary PDP context 430, packets are processed in parallel in three PDP contexts as follows:
- data packets 290 are processed in default PDP context 240,
- VoIP control packets 420 are processed in PDP context 350, and
- VoIP packets are processed in PDP context 430. Taking the specific example of the Session Initiation Protocol [RFC 3261—SIP: Session Initiation Protocol, June 2002] the QoS parameters required for a particular VoIP session can be derived or inferred from the SIP signalling.

A request to set up a session is contained in an INVITE message, e.g.
INVITE sip:UserB@there.com SIP/2.0
Via: SIP/2.0/UDP here.com:5060
From: BigGuy
To: LittleGuy
Call-ID: 12345601@here.com
CSeq: 1 INVITE
Contact:
Content-Type: application/sdp
Content-Length: 147
v=0
o=UserA 2890844526 2890844526 IN IP4 here.com
s=Session SDP
c=IN IP4 100.101.102.103
t=0 0
m=audio 49172 RTP/AVP 4
a=rtpmap:4 G723/8000

In this case the 'c=' parameter identifies the IP address of the caller, the 'm=' parameter identifies this as an RTP audio stream with local UDP port number and the 'a=' parameter identifies the characteristics (bandwidth, encoding) of the audio stream.

The response message indicating answer to this might be:
SIP/2.0 200 OK
Via: SIP/2.0/UDP here.com:5060
From: BigGuy
To: LittleGuy ;tag=8321234356
Call-ID: 12345601@here.com
CSeq: 1 INVITE
Contact:
Content-Type: application/sdp
Content-Length: 147
v=0
o=UserB 2890844527 2890844527 IN IP4 there.com
s=Session SDP
c=IN IP4 110.111.112.113
t=0 0
m=audio 3456 RTP/AVP 4
a=rtpmap:4 G723/8000

In this case the 'c=' parameter identifies the IP address of the called party, the 'm=' parameter identifies this as an RTP audio stream with a type 4 (6.3 kbit/s G.723.1) codec & local UDP port number of the called party and the 'a=' parameter identifies the characteristics of the audio stream—basically the codec.

Finally the ACK message sent by the caller looks like:
ACK sip:UserB@there.com SIP/2.0
Via: SIP/2.0/UDP here.com:5060
From: BigGuy
To: LittleGuy ;tag=8321234356
Call-ID: 12345601@here.com
CSeq: 1 ACK So, by this time the source and destination IP addresses and port numbers+the bandwidth required are known—basically enough to set-up a secondary PDP context to send the packets through.

It will be understood that the application of stateful inspection of packet flows to control UMTS session management as described in the examples above presents a new and advantageous technique providing a UE interface allowing packet flows of different QoS for different applications to be supported simultaneously and in parallel, without requiring special versions of application software (email clients, web browsers, video streaming clients, etc.).

Figure 11:
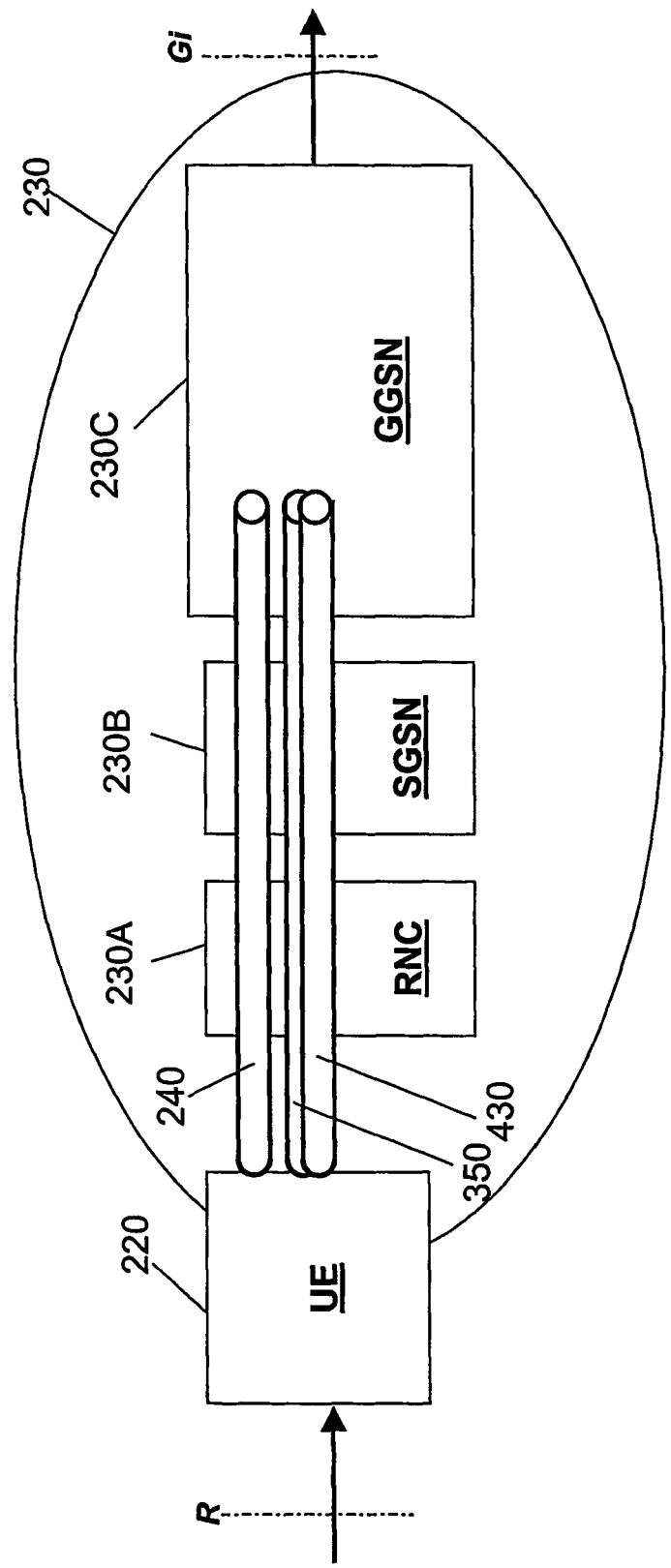
FIG. 11 shows a block schematic diagram of a UMTS network, in which packet sessions (PDP contexts) are created between UE and SGSN and forwarded on through to the GGSN, where the various packet sessions are bonded back together and connected to the target network (e.g., the Internet) in a single packet stream, in accordance with the invention.

Referring now to FIG. 11, viewed in the context of the UTRA system of FIG. 3 or FIG. 7, the VoIP example described above in relation to FIG. 8, FIG. 9 and FIG. 10 can be considered as:

(i) in the UE (220), detecting application-specific session initiation (incoming or outgoing) and setting up secondary PDP contexts to carry application packet streams (350 and 430), and (ii) in GGSN 230C, GTP (GPRS Tunneling Protocol) sessions from SGSN 230B extending the PDP contexts all the way to the GGSN. The GGSN can use the per-PDP context QoS parameters (and any other criteria it sees fit) to classify the IP traffic going into the target IP network.

Thus, in a UMTS network, packet sessions (PDP contexts) are created between the UE and the SGSN (via the Node B—not shown—and RNC 230A) and forwarded on through to the GGSN, where the various packet sessions are bonded back together and connected to the target network (e.g. the Internet) in a single packet stream.

It will be understood that although the invention has been described in the above examples with reference to email (POP3) and VoIP sessions, the invention covers additional or alternative sessions such as: 'conversational' class (e.g., Video over IP) where traffic may be based on originated calls controlled by SIP or H.323 protocol; 'streaming' class (e.g., carrying streaming media traffic controlled by Real Time Streaming Protocol); 'interactive' class; or 'background' class (e.g., carrying POP3 or SMTP traffic).

Figure 12:
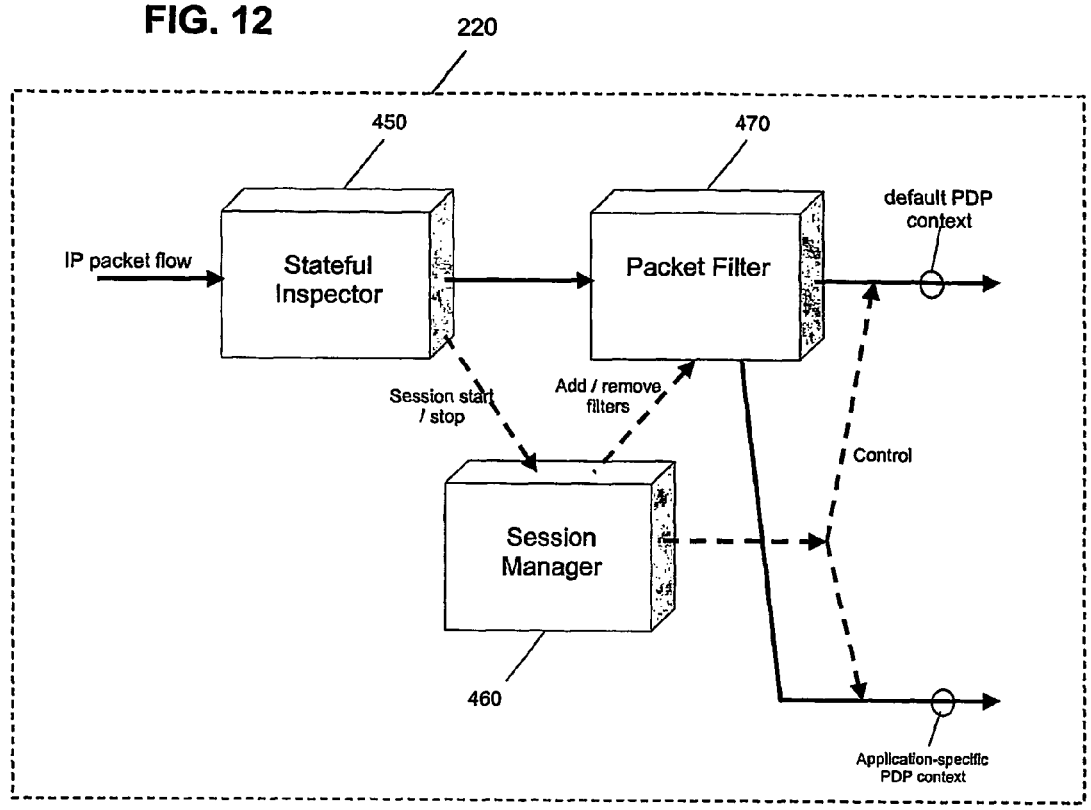
FIG. 12 shows a block schematic diagram illustrating UE packet flow architecture in an uplink direction, in accordance with the invention, in the network of FIG. 11.
Figure 13:
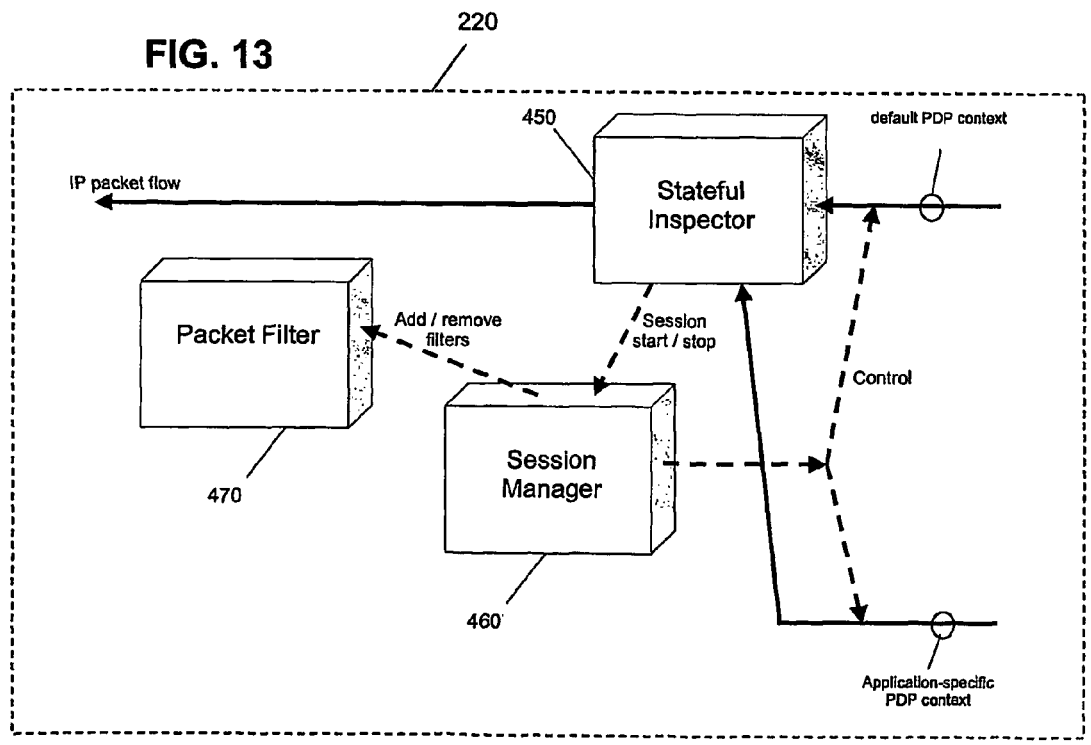
FIG. 13 shows a block schematic diagram illustrating UE packet flow architecture in a downlink direction in accordance with the invention, in the network of FIG. 11.

It will be understood that stateful inspector and packet filter entities exist within the UE; these may be implemented in software, firmware or hardware. The stateful inspector fits in the uplink and downlink packet flow, the packet filter fits in the uplink packet flow (in order to control the split of uplink packets into the correct PDP context). A session management software entity exists within the UE; it controls the activation and de-activation of PDP contexts. The relationship between stateful inspector, packet filter and session management is illustrated in the FIG. 12 and FIG. 13 Referring now to FIG. 12 and FIG. 13, which show uplink and downlink packet flow architectures respectively in the UE (220 or 130A):

The stateful inspector 450:

Detects application-specific control messages in the uplink and the downlink.

Implements an interface to the session management entity 460 to control activation/deactivation of application-specific PDP contexts, including sufficient information regarding the IP packet flow for that instance of that application (source/destination IP address, UDP/TCP indicator and source/destination port number).

Implements an interface from session manager 460 to inform it of timed-out sessions.

Session manager 460:

Implements the interface from the stateful inspector 450 to initiate activation/de-activation of secondary PDP contexts.

Controls the activation/de-activation of secondary (application-specific) PDP contexts over the UMTS air interface.

Implements an interface to add/delete with uplink packet-flow filters in the packet filter entity 470 (source/destination IP address, UDP/TCP indicator and source/destination port number).

The packet filter 470:

Implements the interface from session manager 460 to add/remove packet filters and associate them to secondary PDP contexts in the uplink.

It will be appreciated that the method described above for session management in a UMTS radio access network may be carried out in software running on a processor (not shown), and that the software may be provided as a computer program element carried on any suitable data carrier (also not shown) such as a magnetic or optical computer disc.

It will be also be appreciated that the method described above for session management in a UMTS radio access network may alternatively be carried out in hardware, for example in the form of an integrated circuit (not shown) such as an FPGA (Field Programmable Gate Array) or ASIC (Application Specific Integrated Circuit).

It will be understood that the arrangement and method for session control in a wireless communication network described above provides the advantage of allowing session set-up and tear-down control of dedicated packet sessions for particular data services, in a UMTS 3G mobile wireless network, with application-specific QoS parameters, without the explicit cooperation of the application software (either via software API or modem AT command).

The invention claimed is:

1. A mobile terminal configured to connect a separate device running one or more software applications to a wireless communication network, the mobile terminal comprising an apparatus for session control in a wireless communication network, comprising:
    a stateful inspector configured to detect requested application-specific packets relating to one of said software applications running on the separate device in a packet stream and configured to block application-specific packets in the packet stream that are not the requested application-specific packets; and
    a session manager configured to activate, in response to the stateful inspector detecting the requested application-specific packets, a plurality of packet sessions with application-specific QoS parameters, without requiring explicit cooperation of the software applications running on the separate device.

2. The apparatus of claim 1 wherein the session manager is further configured to deactivate at least one of the plurality of packet sessions.

3. The apparatus of claim 1 wherein the wireless communication network comprises a UMTS radio access network.

4. The apparatus of claim 1, wherein the plurality of packet sessions comprises Packet Data Protocol (PDP) contexts.

5. The apparatus of claim 1 further comprising a packet filter responsive to the stateful inspector.

6. The apparatus of claim 1, wherein the stateful inspector is configured to inspect uplink packet flows to detect application-specific packet flows, via application-specific control messages.

7. The apparatus of claim 1, wherein the stateful inspector is configured to inspect downlink packet flows to detect application-specific packet flows, via application-specific control messages.

8. The apparatus of claim 1, wherein the plurality of packet sessions comprises conversational class PDP contexts.

9. The apparatus of claim 8, wherein the conversational class PDP contexts are arranged to carry Voice over IP (VOIP) traffic.

10. The apparatus of claim 8, wherein the conversational class PDP contexts are arranged to carry Video over IP traffic.

11. The apparatus of claim 9 wherein the traffic is based on originated calls controlled by Session Initiation Protocol (SIP).

12. The apparatus of claim 9 wherein the traffic is based on originated calls controlled by H.323 protocol.

13. The apparatus of claim 1, wherein the plurality of packet sessions comprises streaming class PDP contexts.

14. The apparatus of claim 13, wherein the streaming class PDP contexts are arranged to carry streaming media traffic controlled by Real Time Streaming Protocol.

15. The apparatus of claim 1, wherein the plurality of packet sessions comprises interactive class PDP contexts.

16. The apparatus of claim 1, wherein the plurality of packet sessions comprises background class PDP contexts.

17. The apparatus of claim 16, wherein the background class PDP contexts are arranged to carry Post Office Protocol-Version 3 (POP3) traffic.

18. The apparatus of claim 16, wherein the background class PDP contexts are arranged to carry Simple Mail Transfer Protocol (SMTP) traffic.

19. User equipment (UE) for use in a UTRA system, the user equipment comprising the apparatus of claim 1.

20. An integrated circuit comprising the apparatus of claim 1.

21. A method for session control at a mobile terminal to connect a separate device running one or more software applications to a wireless communication network, comprising:
  detecting requested application-specific packets relating to one of said software applications running on the separate device in a packet stream;
  blocking application-specific packets in the packet stream that are not the requested application-specific packets; and
  activating, in response to detecting the requested application-specific packets, a plurality of packet sessions with application-specific QoS parameters, without requiring explicit cooperation of the software applications running on the separate device.

22. The method of claim 21 further comprising deactivating at least one of the plurality of packet sessions.

23. The method of claim 21 wherein the wireless communication network comprises a UMTS radio access network.

24. The method of claim 21, wherein the plurality of packet sessions comprises Packet Data Protocol (PDP) contexts.

25. The method of claim 21, wherein detecting comprises detecting in a stateful inspector, and the method further comprises providing a session manager and a packet filter responsive to the stateful inspector.

26. The method of claim 21, wherein detecting comprises inspecting uplink packet flows to detect application-specific packet flows, via application-specific control messages.

27. The method of claim 21, wherein detecting comprises inspecting downlink packet flows to detect application-specific packet flows, via application-specific control messages.

28. The method of claim 21, wherein the plurality of packet sessions comprises conversational class PDP contexts.

29. The method of claim 28, wherein the conversational class PDP contexts carry Voice over IP (VOIP) traffic.

30. The method of claim 28, wherein the conversational class PDP contexts carry Video over IP traffic.

31. The method of claim 29 wherein the traffic is based on originated calls controlled by Session Initiation Protocol (SIP).

32. The method of claim 29 wherein the traffic is based on originated calls controlled by H.323 protocol.

33. The method of claim 21, wherein the plurality of packet sessions comprises streaming class PDP contexts.

34. The method of claim 33, wherein the streaming class PDP contexts carry streaming media traffic controlled by Real Time Streaming Protocol.

35. The method of claim 21, wherein the plurality of packet sessions comprises interactive class PDP contexts.

36. The method of claim 21, wherein the plurality of packet sessions comprises background class PDP contexts.

37. The method of claim 36, wherein the background class PDP contexts carry Post Office Protocol-Version 3 (POP3) traffic.

38. The method of claim 36, wherein the background class PDP contexts carry Simple Mail Transfer Protocol (SMTP) traffic.

39. The method of claim 21, wherein the method is performed in User equipment (UE).

40. A non-transitory computer program element having executable program code stored therein for session control to connect a device that is running one or more software applications and that is separate from a user equipment that executes the program code to a wireless communication network, the program code operable for when executed at the user equipment:
  detecting requested application-specific packets relating to one of said software applications running on the separate device in a packet stream;
  blocking application-specific packets in the packet stream that are not the requested application-specific packets; and
  activating, in response to detecting the requested application-specific packets, a plurality of packet sessions with application-specific QoS parameters, without requiring explicit cooperation of the software applications running on the separate device.

41. The apparatus of claim 1, wherein the stateful inspector is configured to inspect packets, implying a state of an application-specific packet session via inspected control packets and allowing packets for a session to flow through a firewall if said session originated from inside the firewall or otherwise, blocking said session.

42. The method of claim 25, wherein detecting in a stateful inspector comprises inspecting packets, implying a state of an application-specific packet session via inspected control packets and allowing packets for a session to flow through a firewall if said session originated from inside the firewall or otherwise, blocking said session.

* * * * *